(12) United States Patent
Sharma (10) Patent No.: US 12,147,688 B2
(45) Date of Patent: Nov. 19, 2024

(54) SYSTEM AND METHOD FOR MONITORING STORAGE INFRASTRUCTURE CONFIGURATION DRIFT

(71) Applicant: JPMorgan Chase Bank, N.A., New York, NY (US)

(72) Inventor: Pihu Sharma, Metuchen, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/212,432

(22) Filed: Jun. 21, 2023

(65) Prior Publication Data

US 2023/0418483 A1    Dec. 28, 2023

Related U.S. Application Data

(60) Provisional application No. 63/367,089, filed on Jun. 27, 2022.

(51) Int. Cl.
*G06F 3/06* (2006.01)
*G06F 8/71* (2018.01)
*G06F 11/34* (2006.01)

(52) U.S. Cl.
CPC .......... *G06F 3/0629* (2013.01); *G06F 3/0604* (2013.01); *G06F 3/0673* (2013.01);
(Continued)

(58) Field of Classification Search
None
See application file for complete search history.

(56) References Cited

U.S. PATENT DOCUMENTS 11,023,218 B1 * 6/2021 Lu .................. G06F 16/2455

FOREIGN PATENT DOCUMENTS

| CN | 102576354 A | * | 7/2012 | ............ G06F 11/203 |
| CN | 102754075 A | * | 10/2012 | ............ G06F 15/16 |
| EP | 3944020 A1 | * | 1/2022 | ............ G03F 7/705 |

OTHER PUBLICATIONS

Erik Bledsoe, "What is configuration drift?", Mar. 3, 2022, pp. 1-12, https://coder.com/blog/what-is-configuration-drift (Year: 2022).*
(Continued)

*Primary Examiner* — Christopher D Birkhimer
(74) *Attorney, Agent, or Firm* — GREENBLUM & BERNSTEIN, P.L.C.

(57) ABSTRACT

Various methods, apparatuses/systems, and media for monitoring configuration drift are disclosed. A processor establishes a communication link between a version control system and an eco-system including a plurality of systems each including corresponding normalized baseline configuration data; receives the normalized baseline configuration data for each system from the eco-system; creates a model based on the normalized baseline configuration data. The model includes a normalized set of hierarchical attributes data to maintain all baseline configuration associated with plurality of systems. The processor also stores the model including the normalized set of hierarchical attributes data onto the version control system; tracks configuration change data associated with each system in real-time via the version control system; automatically detects a configuration drift by comparing the baseline configuration data with the configuration change data; and automatically updates the model to monitor the configuration drift.

20 Claims, 6 Drawing Sheets

(52) U.S. Cl.
CPC .............. *G06F 3/0685* (2013.01); *G06F 8/71* (2013.01); *G06F 11/34* (2013.01)

(56) References Cited

OTHER PUBLICATIONS

Steve Petryschuk, "Preventing Network Configuration Drift", Jan. 25, 2022, pp. 1-11, https://www.auvik.com/franklyit/blog/network-configuration-drift/ (Year: 2022).*

* cited by examiner

SYSTEM AND METHOD FOR MONITORING STORAGE INFRASTRUCTURE CONFIGURATION DRIFT

CROSS-REFERENCE TO RELATED APPLICATIONS

This application claims the benefit of priority from U.S. Provisional Patent Application No. 63/367,089, filed Jun. 27, 2022, which is herein incorporated by reference in its entirety.

TECHNICAL FIELD

This disclosure generally relates to storage infrastructure, and, more particularly, to methods and apparatuses for implementing a language and platform agnostic drift monitoring application module for monitoring storage infrastructure configuration drift.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Often a configuration change is necessary for an information technology system. A change in configuration may potentially cause a change in behavior in the system which may result in a performance problem. When a configuration change occurs, if a metric goes outside its baseline, an abnormality event is generally generated to alert the system administrator. Some configuration changes may cause other metrics to behave differently as well. Particularly, monitoring storage infrastructure configuration drift may often prove to be critical to monitor an organization's risk posture. Today, there may be a challenge with maintaining and tracking the baseline configuration, against which drift needs to be monitored. Due to the complexity of storage infrastructure scale, deployment and geographical topology, the configuration may often be disorganized in several places, and there may be a lack of auditability on changes made to this configuration. Moreover, conventional tools lack capabilities in tracking whether configuration change has gone through appropriate reviews before being applied.

For example, at times, storage infrastructure environment can have several versions of baseline configuration applied based on type of infrastructure, maintenance schedules and other factors. Monitoring drift against an ever changing, often poorly reviewed configuration which may be located on disparate locations, and where same type of infrastructure may be running on different baselines, is a very complex problem. For example, a typical storage infrastructure ecosystem of an organization, such as JPMorgan and Chase, is complex with various types of technologies and proprietary platforms. Conventional configuration management tools lack the capability to adhere to all the requirements of this eco-system and fail to provide the flexibility of multiple baseline management, auditability, review, and drift monitoring.

Thus, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a language and platform agnostic drift monitoring application module for providing flexibility of multiple baseline management, auditability, review and configuration drift monitoring for storage infrastructure eco-system, but the disclosure is not limited thereto.

According to exemplary embodiments, a method for monitoring configuration drift by utilizing one or more processors along with allocated memory is disclosed. The method may include: establishing a communication link between a version control system and an eco-system including a plurality of systems each including corresponding normalized baseline configuration data; receiving the normalized baseline configuration data for each system from the eco-system; creating a model based on the normalized baseline configuration data, wherein the model includes a normalized set of hierarchical attributes data to maintain all baseline configuration associated with plurality of systems; storing the model including the normalized set of hierarchical attributes data onto the version control system; tracking configuration change data associated with each system in real-time via the version control system; automatically detecting a configuration drift by comparing the baseline configuration data with the configuration change data; and automatically updating the model to monitor the configuration drift.

According to exemplary embodiments, the method may further include: calling a first application programming interface (API) to load the model from the version control system into a database so that the baseline configuration data can still be traced back to the version control system by implementing immutable tags; calling a second API to pull the baseline configuration data from the database in real time to apply to different types of infrastructure; and calling a third API to monitor the configuration drift against the baseline configuration data.

According to exemplary embodiments, the method may further include: implementing a source code mathematical system algorithm to manage the baseline configuration data from the version control system; automatically hydrating a runtime environment with all changes corresponding to the tracked configuration change data; and determining whether to execute a self-healing process to manage the configuration drift or whether to implement an outage operation to resolve the configuration drift.

According to exemplary embodiments, the method may further include: executing the self-healing process based on a determination that a value associated with the configuration drift is below a predetermined threshold value.

According to exemplary embodiments, the method may further include: executing the outage operation to resolve the drift based on a determination that a value associated with the configuration drift is equal to or above a predetermined threshold value.

According to exemplary embodiments, the baseline configuration data may correspond to storage baseline infrastructure configuration data associated with each system among the plurality of systems of the eco-system, but the disclosure is not limited thereto.

According to exemplary embodiments, the configuration drift may correspond to storage infrastructure configuration drift associated with each system among the plurality of systems of the eco-system, and the method may further include: automatically updating the model to monitor a storage infrastructure configuration drift associated with each system among the plurality of systems of the eco-system.

According to exemplary embodiments, a system for monitoring configuration drift is disclosed. The system may include: a processor; and a memory operatively connected to the processor via a communication interface, the memory storing computer readable instructions, when executed, may cause the processor to: establish a communication link between a version control system and an eco-system including a plurality of systems each including corresponding normalized baseline configuration data; receive the normalized baseline configuration data for each system from the eco-system; create a model based on the normalized baseline configuration data, wherein the model includes a normalized set of hierarchical attributes data to maintain all baseline configuration associated with plurality of systems; store the model including the normalized set of hierarchical attributes data onto the version control system; track configuration change data associated with each system in real-time via the version control system; automatically detect a configuration drift by comparing the baseline configuration data with the configuration change data; and automatically update the model to monitor the configuration drift.

According to exemplary embodiments, the processor may be further configured to: call a first application programming interface (API) to load the model from the version control system into a database so that the baseline configuration data can still be traced back to the version control system by implementing immutable tags; call a second API to pull the baseline configuration data from the database in real time to apply to different types of infrastructure; and call a third API to monitor the configuration drift against the baseline configuration data.

According to exemplary embodiments, the processor may be further configured to: implement a source code mathematical system algorithm to manage the baseline configuration data from the version control system; automatically hydrate a runtime environment with all changes corresponding to the tracked configuration change data; and determine whether to execute a self-healing process to manage the configuration drift or whether to implement an outage operation to resolve the configuration drift.

According to exemplary embodiments, the processor may be further configured to: execute the self-healing process based on a determination that a value associated with the configuration drift is below a predetermined threshold value.

According to exemplary embodiments, the processor may be further configured to: execute the outage operation to resolve the drift based on a determination that a value associated with the configuration drift is equal to or above a predetermined threshold value.

According to exemplary embodiments, the configuration drift may correspond to storage infrastructure configuration drift associated with each system among the plurality of systems of the eco-system, and the processor may be further configured to: automatically update the model to monitor a storage infrastructure configuration drift associated with each system among the plurality of systems of the eco-system.

According to exemplary embodiments, a non-transitory computer readable medium configured to store instructions for monitoring configuration drift is disclosed. The instructions, when executed, may cause a processor to perform the following: establishing a communication link between a version control system and an eco-system including a plurality of systems each including corresponding normalized baseline configuration data; receiving the normalized baseline configuration data for each system from the eco-system; creating a model based on the normalized baseline configuration data, wherein the model includes a normalized set of hierarchical attributes data to maintain all baseline configuration associated with plurality of systems; storing the model including the normalized set of hierarchical attributes data onto the version control system; tracking configuration change data associated with each system in real-time via the version control system; automatically detecting a configuration drift by comparing the baseline configuration data with the configuration change data; and automatically updating the model to monitor the configuration drift.

According to exemplary embodiments, the instructions, when executed, may cause the processor to further perform the following: calling a first application programming interface (API) to load the model from the version control system into a database so that the baseline configuration data can still be traced back to the version control system by implementing immutable tags; calling a second API to pull the baseline configuration data from the database in real time to apply to different types of infrastructure; and calling a third API to monitor the configuration drift against the baseline configuration data.

According to exemplary embodiments, the instructions, when executed, may cause the processor to further perform the following: implementing a source code mathematical system algorithm to manage the baseline configuration data from the version control system; automatically hydrating a runtime environment with all changes corresponding to the tracked configuration change data; and determining whether to execute a self-healing process to manage the configuration drift or whether to implement an outage operation to resolve the configuration drift.

According to exemplary embodiments, the instructions, when executed, may cause the processor to further perform the following: executing the self-healing process based on a determination that a value associated with the configuration drift is below a predetermined threshold value.

According to exemplary embodiments, the instructions, when executed, may cause the processor to further perform the following: executing the outage operation to resolve the drift based on a determination that a value associated with the configuration drift is equal to or above a predetermined threshold value.

According to exemplary embodiments, the configuration drift may correspond to storage infrastructure configuration drift associated with each system among the plurality of systems of the eco-system, and the instructions, when executed, may cause the processor to further perform the following: automatically updating the model to monitor a storage infrastructure configuration drift associated with each system among the plurality of systems of the eco-system.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
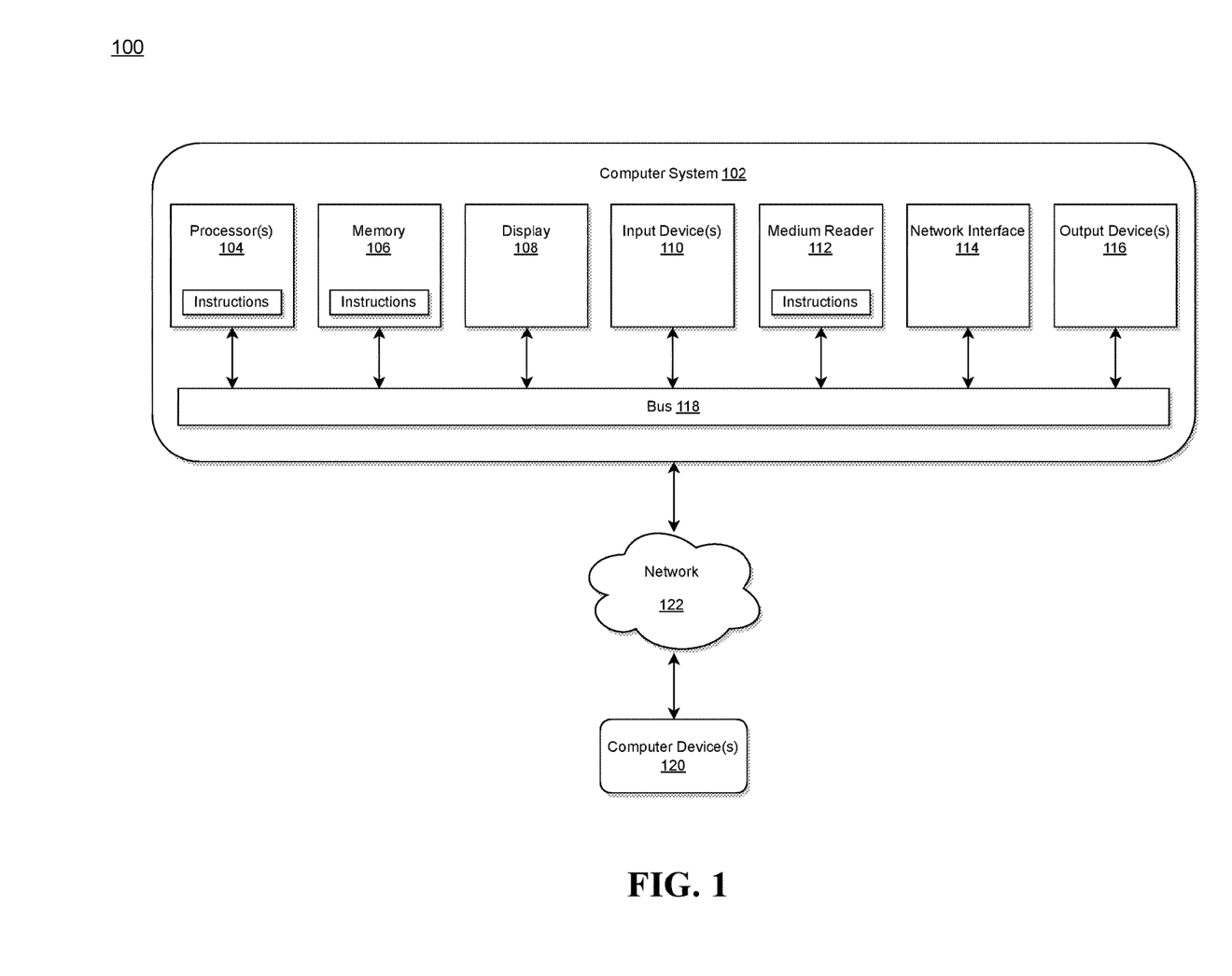
FIG. 1 illustrates a computer system for implementing a platform and language agnostic drift monitoring application module that may be configured for automatically monitoring configuration drift in accordance with an exemplary embodiment.

FIG. 1 is an exemplary system 100 for use in implementing a platform and language agnostic drift monitoring application module that may be configured for providing flexibility of multiple baseline management, auditability, review and configuration drift monitoring for storage infrastructure eco-system, in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the multi-armed bandit application module may be platform and language agnostic that may allow for consistent easy orchestration and passing of data through various components to output a desired result. Since the disclosed process, according to exemplary embodiments, is platform and language agnostic, the multi-armed bandit application module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
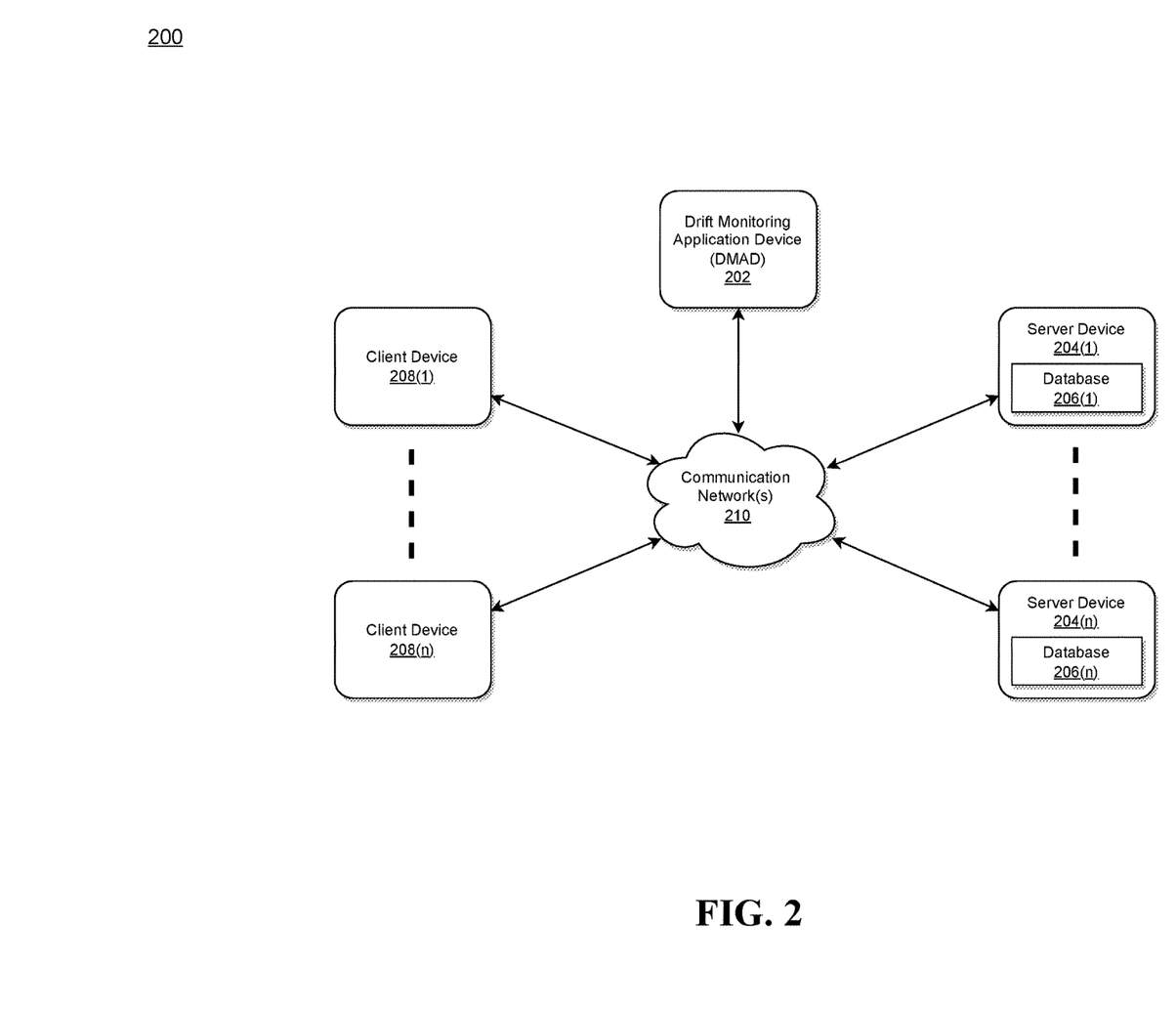
FIG. 2 illustrates an exemplary diagram of a network environment with a platform and language agnostic drift monitoring application device in accordance with an exemplary embodiment.

Referring to FIG. 2, a schematic of an exemplary network environment 200 for implementing a platform and language drift monitoring application device (DMAD) of the instant disclosure is illustrated.

According to exemplary embodiments, the above-described problems associated with conventional tools may be overcome by implementing an DMAD 202 as illustrated in FIG. 2 that may be configured for providing flexibility of multiple baseline management, auditability, review and configuration drift monitoring for storage infrastructure ecosystem, but the disclosure is not limited thereto.

The DMAD 202 may be the same or similar to the computer system 102 as described with respect to FIG. 1.

The DMAD 202 may store one or more applications that can include executable instructions that, when executed by the DMAD 202, cause the DMAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DMAD 202 itself, may be located in virtual server(s) running in a cloud-based computing environment rather than being tied to one or more specific physical network computing devices. Also, the application(s) may be running in one or more virtual machines (VMs) executing on the DMAD 202. Additionally, in one or more embodiments of this technology, virtual machine(s) running on the DMAD 202 may be managed or supervised by a hypervisor.

In the network environment 200 of FIG. 2, the DMAD 202 is coupled to a plurality of server devices 204(1)-204(n) that hosts a plurality of databases 206(1)-206(n), and also to a plurality of client devices 208(1)-208(n) via communication network(s) 210. A communication interface of the DMAD 202, such as the network interface 114 of the computer system 102 of FIG. 1, operatively couples and communicates between the DMAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DMAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DMAD 202 may be a standalone device or integrated with one or more other devices or apparatuses, such as one or more of the server devices 204(1)-204(n), for example. In one particular example, the DMAD 202 may be hosted by one of the server devices 204(1)-204(n), and other arrangements are also possible. Moreover, one or more of the devices of the DMAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DMAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DMAD 202 that may efficiently provide a platform for implementing a platform and language agnostic drift monitoring application module for providing flexibility of multiple baseline management, auditability, review and configuration drift monitoring for storage infrastructure eco-system, but the disclosure is not limited thereto.

The client devices 208(1)-208(n) may run interface applications, such as standard web browsers or standalone client applications, which may provide an interface to communicate with the DMAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DMAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DMAD 202, the server devices 204(1)-204(n), or the client devices 208(1)-208(n), for example, may be configured to operate as virtual instances on the same physical machine. For example, one or more of the DMAD 202, the server devices 204(1)-204(n), or the client devices 208(1)-208(n) may operate on the same physical device rather than as separate devices communicating through communication network(s) 210. Additionally, there may be more or fewer DMADs 202, server devices 204(1)-204(n), or client devices 208(1)-208(n) than illustrated in FIG. 2. According to exemplary embodiments, the DMAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
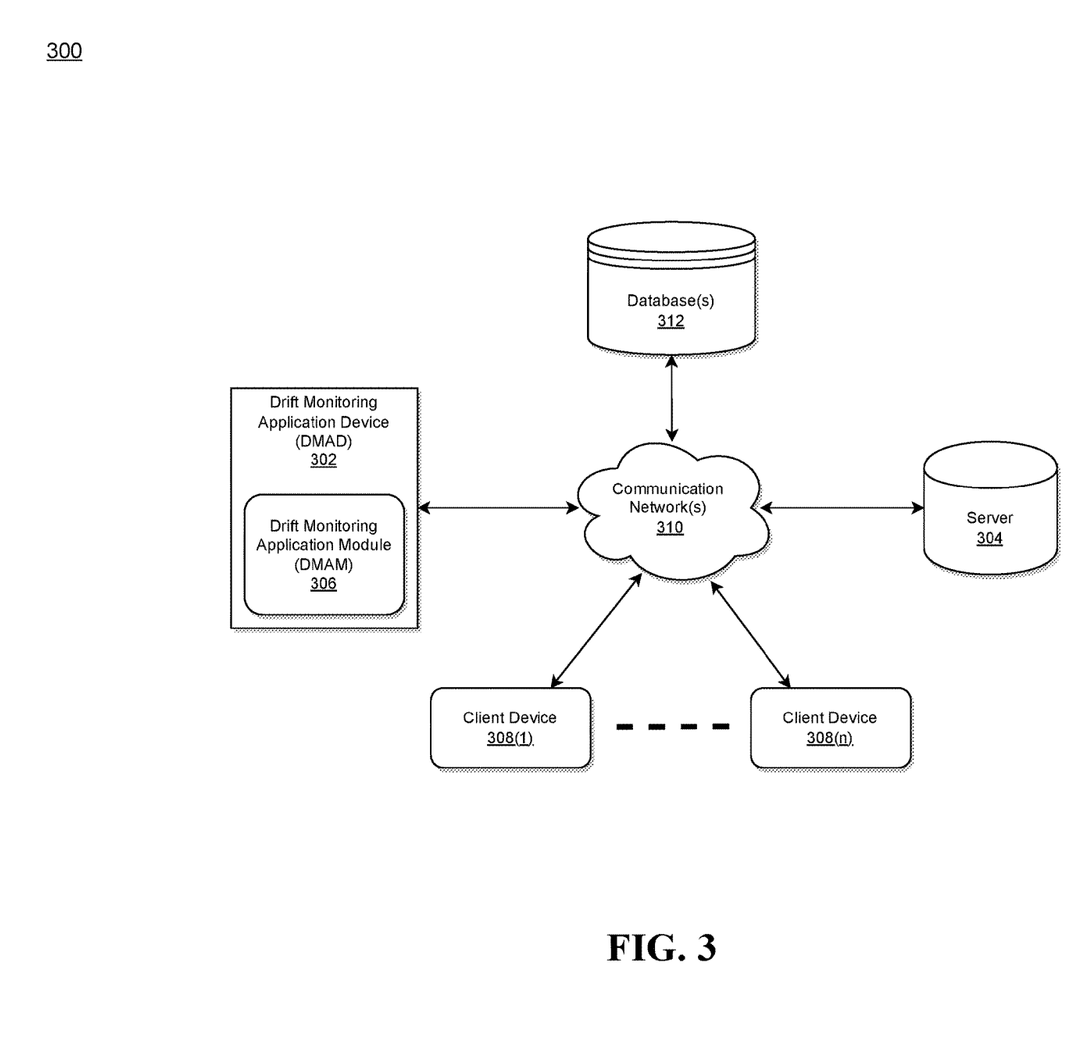
FIG. 3 illustrates a system diagram for implementing a platform and language agnostic drift monitoring application device having a platform and language agnostic drift monitoring application module in accordance with an exemplary embodiment.

FIG. 3 illustrates a system diagram for implementing an DMAD having a platform and language agnostic drift monitoring application module (DMAM) in accordance with an exemplary embodiment.

As illustrated in FIG. 3, the system 300 may include a DMAD 302 within which an DMAM 306 is embedded, a server 304, a database(s) 312, a plurality of client devices 308(1) . . . 308(n), and a communication network 310.

According to exemplary embodiments, the DMAD 302 including the DMAM 306 may be connected to the server 304, and the database(s) 312 via the communication network 310. The DMAD 302 may also be connected to the plurality of client devices 308(1) . . . 308(n) via the communication network 310, but the disclosure is not limited thereto.

According to exemplary embodiment, the DMAD 302 is described and shown in FIG. 3 as including the DMAM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may that may produce programming for searching, monitoring, and analyzing machine-generated data via a web interface, etc., but the disclosure is not limited thereto.

According to exemplary embodiments, the DMAM 306 may be configured to receive real-time feed of data from the plurality of client devices 308(1) . . . 308(n) via the communication network 310.

As will be described below, the DMAM 306 may be configured to: establish a communication link between a version control system and an eco-system including a plurality of systems each including corresponding baseline configuration data; receive the baseline configuration data for each system from the eco-system; normalize the received baseline configuration data; create a model based on the normalized baseline configuration data, wherein the model includes a normalized set of hierarchical attributes data to maintain all baseline configuration associated with plurality of systems; store the model including the normalized set of hierarchical attributes data onto the version control system; track configuration change data associated with each system in real-time via the version control system; automatically detect a configuration drift by comparing the baseline configuration data with the configuration change data; and automatically update the model to monitor the configuration drift, but the disclosure is not limited thereto.

The plurality of client devices 308(1) . . . 308(n) are illustrated as being in communication with the DMAD 302. In this regard, the plurality of client devices 308(1) . . . 308(n) may be "clients" (e.g., customers) of the DMAD 302 and are described herein as such. Nevertheless, it is to be known and understood that the plurality of client devices 308(1) . . . 308(n) need not necessarily be "clients" of the DMAD 302, or any entity described in association therewith herein. Any additional or alternative relationship may exist between either or both of the plurality of client devices 308(1) . . . 308(n) and the DMAD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DMAD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DMAD 302 may be the same or similar to the DMAD 202 as described with respect to FIG. 2, including any features or combination of features described with respect thereto.

Figure 4:
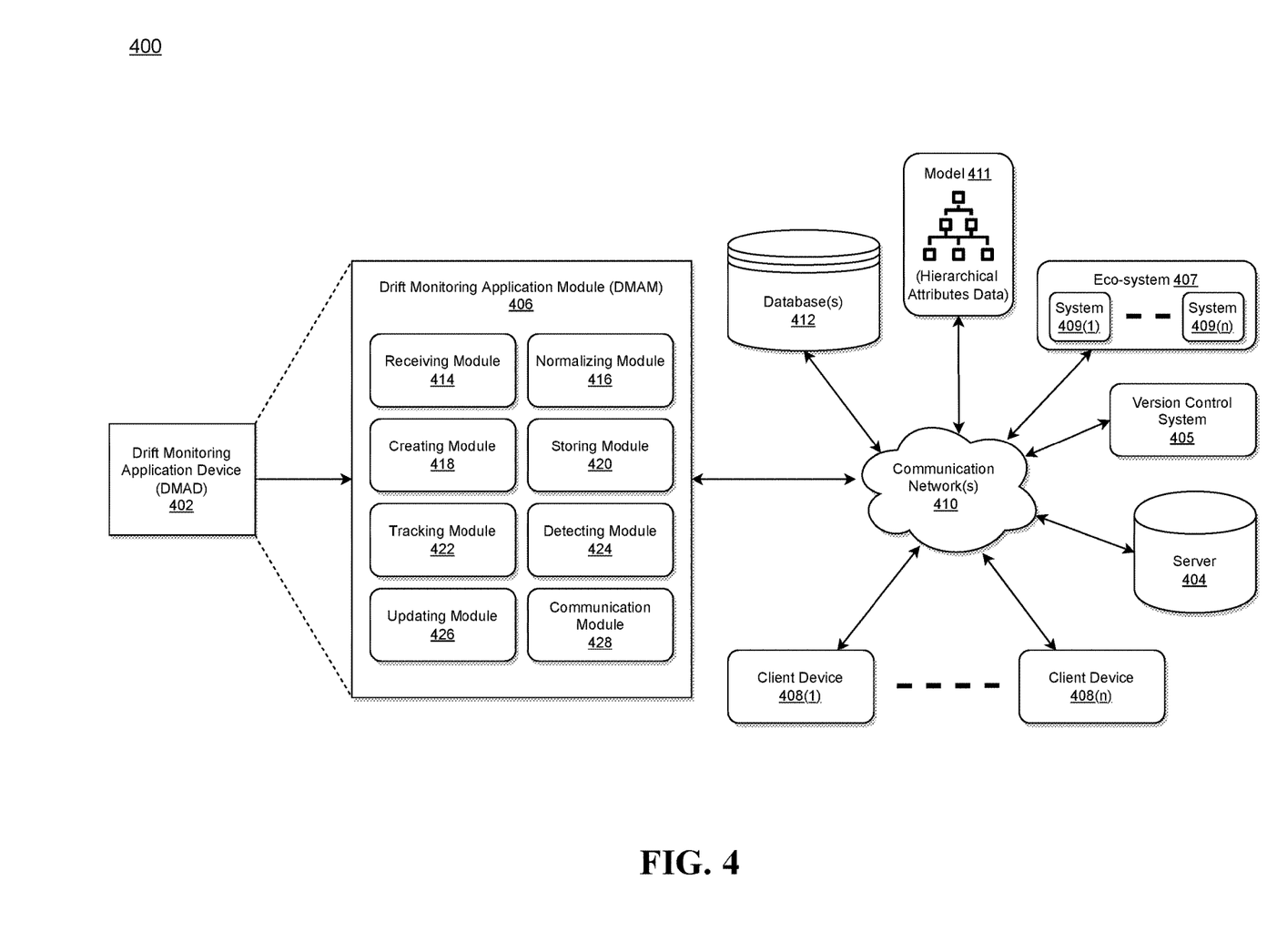
FIG. 4 illustrates a system diagram for implementing a platform and language agnostic drift monitoring application module of FIG. 3 in accordance with an exemplary embodiment.

FIG. 4 illustrates a system diagram for implementing a DMAM of FIG. 3 in accordance with an exemplary embodiment.

According to exemplary embodiments, the system 400 may include a platform and language agnostic DMAD 402 within which a platform and language agnostic DMAM 406 is embedded, a server 404, a version control system 405, an eco-system 407 including a plurality of systems each including corresponding baseline configuration data, database(s) 412, and a communication network 410.

According to exemplary embodiments, the DMAD 402 including the DMAM 406 may be connected to the server 404, the version control system 405, the eco-system 407 and the database(s) 412 via the communication network 410. The DMAD 402 may also be connected to the plurality of client devices 408(1)-408(n) via the communication network 410, but the disclosure is not limited thereto. The DMAM 406, the server 404, the plurality of client devices 408(1)-408(n), the database(s) 412, the communication network 410 as illustrated in FIG. 4 may be the same or similar to the DMAM 306, the server 304, the plurality of client devices 308(1)-308(n), the database(s) 312, the communication network 310, respectively, as illustrated in FIG. 3.

According to exemplary embodiments, as illustrated in FIG. 4, the DMAM 406 may include a receiving module 414, a normalizing module 416, a creating module 418, a storing module 420, a tracking module 422, a detecting module 424, an updating module 426, and a communication module 428.

According to exemplary embodiments, each of the receiving module 414, normalizing module 416, creating module 418, storing module 420, tracking module 422, detecting module 424, updating module 426, and the communication module 428 of the DMAM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, normalizing module 416, creating module 418, storing module 420, tracking module 422, detecting module 424, updating module 426, and the communication module 428 of the DMAM 406 may be implemented by microprocessors or similar, and may be programmed using software (e.g., microcode) to perform various functions discussed herein and may optionally be driven by firmware and/or software.

Alternatively, according to exemplary embodiments, each of the receiving module 414, normalizing module 416, creating module 418, storing module 420, tracking module 422, detecting module 424, updating module 426, and the communication module 428 of the DMAM 406 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, normalizing module 416, creating module 418, storing module 420, tracking module 422, detecting module 424, updating module 426, and the communication module 428 of the DMAM 406 may be called via corresponding API.

The process may be executed via the communication module 428 and the communication network 410, which may comprise plural networks as described above. For example, in an exemplary embodiment, the various components of the DMAM 406 may communicate with the server 404, the version control system 405, the eco-system 407, and the database(s) 412 via the communication module 428 and the communication network 410. Of course, these embodiments are merely exemplary and are not limiting or exhaustive.

According to exemplary embodiments, the version control system 405 may be a distributed version control system designed to handle everything from small to very large projects with speed and efficiency.

For example, according to exemplary embodiments, the communication module 428 may be configured to establish a communication link between the version control system 405 and the eco-system 407. The eco-system 407 may include a plurality of systems 409(1)-409(n) each including corresponding baseline configuration data.

According to exemplary embodiments, the receiving module 414 may be configured to receive the baseline configuration data for each system 409(1)-409(n) from the eco-system 407.

According to exemplary embodiments, the normalizing module 416 may be configured to normalize the received baseline configuration data. The creating module 418 may be then create a model 411 based on the normalized baseline configuration data. The model 411 may include a normalized set of hierarchical attributes data to maintain all baseline configuration associated with plurality of systems 409(1)-409(n).

According to exemplary embodiments, the storing module 420 may be configured to store the model 411 including the normalized set of hierarchical attributes data onto the version control system 406. The tracking module 422 may be configured to track any configuration change data associated with each system 409(1)-409(n) in real-time via the version control system 405. The detecting module 424 may be configured to automatically detecting a configuration drift by comparing the baseline configuration data with the configuration change data. The updating module 426 may be configured to automatically update the model 411 to monitor the configuration drift.

According to exemplary embodiments, the DMAM 406 may be further configured to call a first API to load the model 411 from the version control system 405 into the database(s) 412 so that the baseline configuration data can still be traced back to the version control system 405 by implementing immutable tags. The DMAM 406 may be further configured to call a second API to pull the baseline configuration data from the database(s) 412 in real time to apply to different types of infrastructure and call a third API to monitor the configuration drift against the baseline configuration data.

According to exemplary embodiments, the DMAM 406 may be further configured to implement a source code mathematical system algorithm to manage the baseline configuration data from the version control system 405; automatically hydrate a runtime environment with all changes corresponding to the tracked configuration change data; and determine whether to execute a self-healing process to manage the configuration drift or whether to implement an outage operation to resolve the configuration drift. According to exemplary embodiments, may include new standards, rules, process, etc. for configuration.

According to exemplary embodiments, the DMAM 406 may be configured to execute the self-healing process based on a determination that a value associated with the configuration drift is below a predetermined threshold value.

According to exemplary embodiments, the DMAM 406 may be configured to execute the outage operation to resolve the drift based on a determination that a value associated with the configuration drift is equal to or above a predetermined threshold value.

According to exemplary embodiments, the predetermined threshold value may represent a percentage (%) of change data based on comparing new configuration data with pre-stored configuration data associated with a system among the plurality of systems 409(1)-409(n) of the eco-system 407. For example, if a value associated with the configuration drift (i.e., change data percentage) is less than 30%, the DMAM 406 executes the self-healing process to resolve the drift and maintains the system within the eco-system 407. However, if a value associated with the configuration drift (i.e., change data percentage) is equal to or above 30%, the DMAM 406 executes the outage operation to resolve the drift by taking off the system from the eco-system 407 and reuploading it onto the eco-system 407 when the system is fixed. The value 30% is just exemplary. The DMAM 406 may be configured to utilize any other desired percentage value, i.e., 10%, 15%, 20%, 25%, 35%, etc., but the disclosure is not limited thereto.

According to exemplary embodiments, the baseline configuration data may correspond to storage baseline infrastructure configuration data associated with each system among the plurality of systems 409(1)-409(n) of the eco-system 407, but the disclosure is not limited thereto.

According to exemplary embodiments, the configuration drift may correspond to storage infrastructure configuration drift associated with each system among the plurality of systems 409(1)-409(n) of the eco-system 407. The updating module 426 may be configured to automatically update the model 411 to monitor a storage infrastructure configuration drift associated with each system among the plurality of systems 409(1)-409(n) of the eco-system 407.

According to exemplary embodiments, the baseline configuration is normalized by the normalizing module 416 so that the baseline configuration can be maintained as one body of controls, which can be applied to multiple topologies, infrastructure platforms and technologies, multiple geographical locations and environments of the eco-system 407.

According to exemplary embodiments, the DMAM 406 is configured in a manner such that the baseline configuration changes become auditable, historical changes is preserved, and approvals or reviews of configuration is tracked in an automated manner as disclosed herein, thereby improving system performance.

According to exemplary embodiments, the DMAM 406 is configured in a manner such that the baseline configuration drift monitoring process dynamically pulls the configuration data from where baseline configuration is tracked in real time for an infrastructure (i.e., a system in question among the plurality of systems 409(1)-409(n) of the eco-system 407, to measure drift in the environment. According to exemplary embodiments, the baseline configuration is a group of settings data placed on a system among the plurality of systems 409(1)-409(n) of the eco-system 407 before it is approved for production, but the disclosure is not limited to this use case. Using baselines is a technique that evolved from administration checklists to ensure systems 409(1)-409(n) of the eco-system 407 are set up correctly for their intended purpose.

Figure 5:
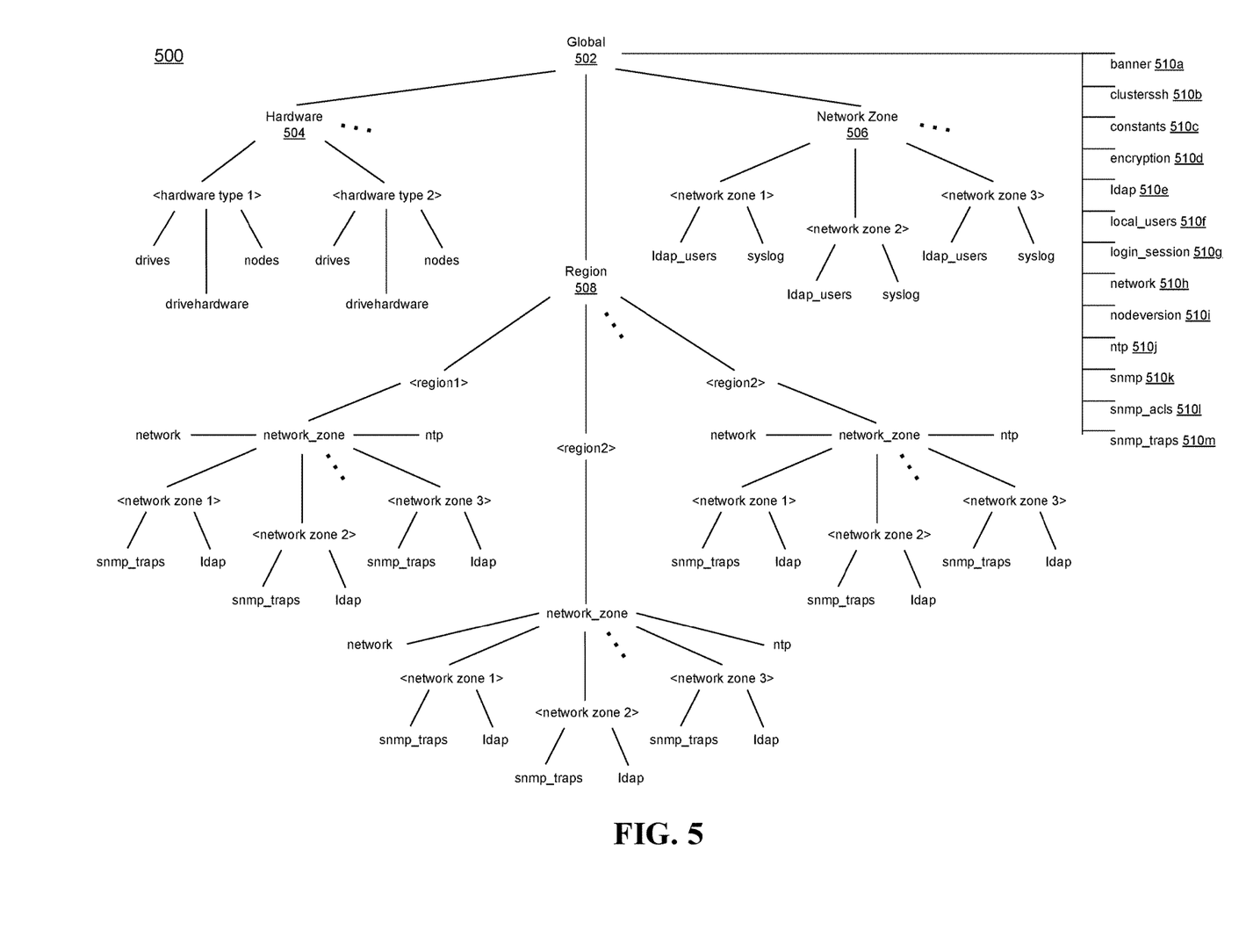
FIG. 5 illustrates an exemplary normalized hierarchical configuration for block storage product implemented by the platform and language agnostic drift monitoring application module of FIG. 4 in accordance with an exemplary embodiment.

FIG. 5 illustrates an exemplary normalized hierarchical configuration 500 for block storage product implemented by the platform and language agnostic DMAM 406 of FIG. 4 in accordance with an exemplary embodiment. For example, the exemplary the model 411 may include the normalized hierarchical configuration 500 for block storage product including the normalized set of hierarchical attributes data illustrated in FIG. 5. For example, the normalized hierarchical configuration 500 may include a plurality of nodes (parent), e.g., global 502, banner 510a, clusterssh 510b (a utility that allows you to manage multiple servers over SSH from a single administration console), constants 510c, encryption 510d, ldap 510e, local_users 510f, login_session 510g, network 510h, nodeversion 510i, ntp (network time protocol) 510j, snmp (simple network management protocol) 510k, snmp_acls 510l (where acls stands for access-control lists), and snmp_traps 510m, but the disclosure is not limited thereto.

Although FIG. 5 illustrates exemplary details of normalized hierarchical configuration of the node (parent), "global 502" (i.e., sub-nodes (child), sub-sub-nodes (grandchild), etc.), similar normalized hierarchical configuration for other nodes can also be constructed within the scope or the disclosed invention.

As illustrated in FIG. 5, node global 502 may include a plurality of sub-nodes, e.g., hardware 505, network zone 506, and region 508, but the disclosure is not limited thereto. Each of the sub-nodes hardware 505, network zone 506, and region 508 may include corresponding sub-sub-nodes. For example, hardware 504 may include a plurality of hardware types (i.e., hardware type 1, hardware type 2, etc.). Each hardware type may include corresponding drivers, driver hardware, and nodes, but the disclosure is not limited thereto. Network zone 506 may include a plurality of network zones (i.e., network zone 1, network zone 2, network zone 3, etc.). Each network zone may include corresponding ldap_users and syslog, but the disclosure is not limited thereto. Region 508 may include a plurality of regions (i.e., region 1, region 2, region 3, etc.). Each region of the plurality of regions may include its own plurality of network zones (i.e., network zone 1, network zone 2, network zone 3, etc. within the region 508), network, and ntp, but the disclosure is not limited thereto. Each network zone (i.e., network zone 1, network zone 2, network zone 3, etc. within the region 508) may include snmp_traps and ldap, but the disclosure is not limited thereto.

Figure 6:
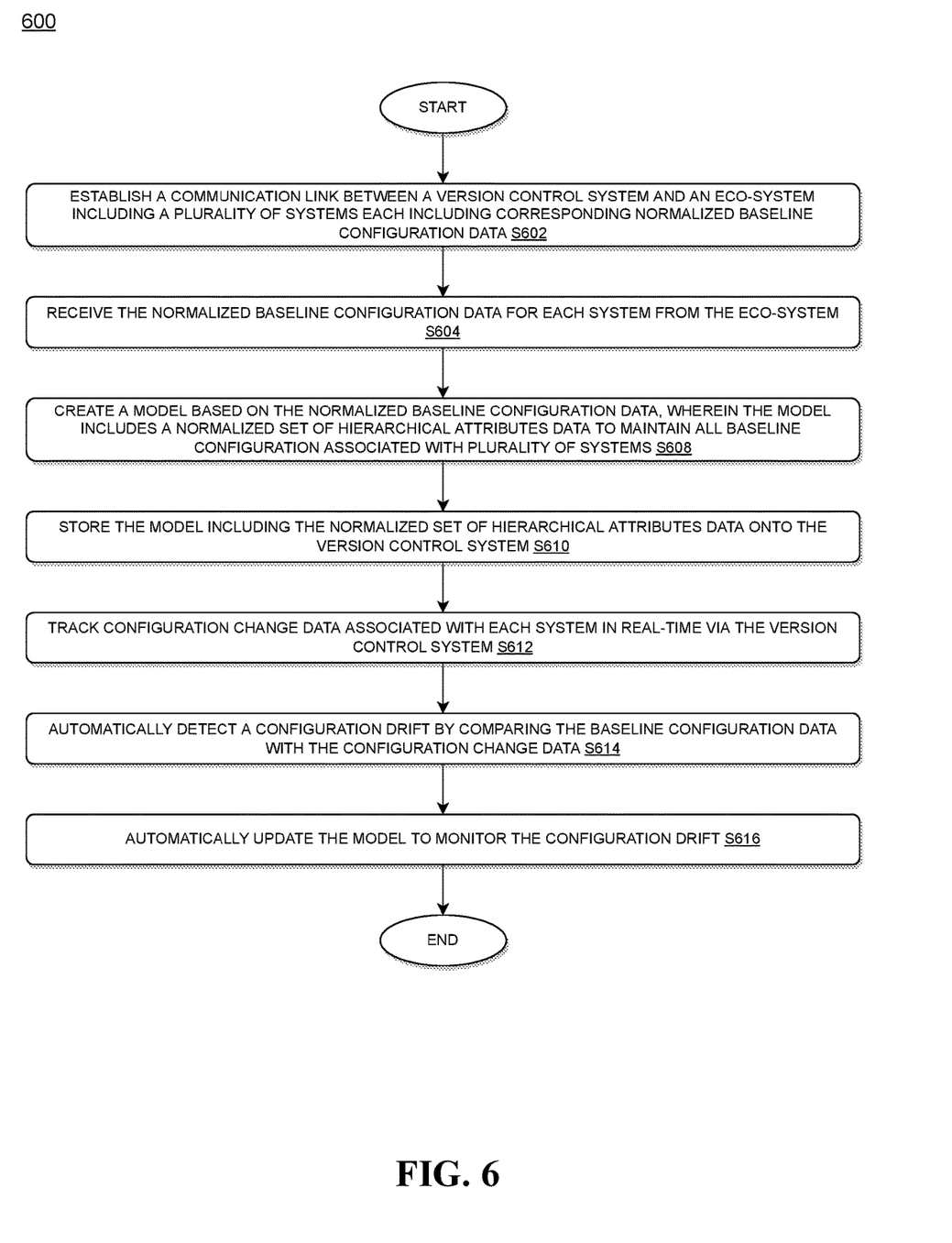
FIG. 6 illustrates an exemplary flow chart implemented by the platform and language agnostic drift monitoring application module of FIG. 4 for automatically monitoring configuration drift in accordance with an exemplary embodiment.

FIG. 6 illustrates an exemplary flow chart of a process 600 implemented by the DMAM 406 of FIG. 4 for automatically monitoring configuration drift in accordance with an exemplary embodiment. It will be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include establishing a communication link between a version control system and an eco-system including a plurality of systems each including corresponding normalized baseline configuration data.

At step S604, the process 600 may include receiving the normalized baseline configuration data for each system from the eco-system.

At step S608, the process 600 may include creating a model based on the normalized baseline configuration data, wherein the model includes a normalized set of hierarchical attributes data to maintain all baseline configuration associated with plurality of systems.

At step S610, the process 600 may include storing the model including the normalized set of hierarchical attributes data onto the version control system.

At step S612, the process 600 may include tracking configuration change data associated with each system in real-time via the version control system.

At step S614, the process 600 may include automatically detecting a configuration drift by comparing the baseline configuration data with the configuration change data.

At step S616, the process 600 may include automatically updating the model to monitor the configuration drift.

According to exemplary embodiments, the process 600 may further include: calling a first application programming interface (API) to load the model from the version control system into a database so that the baseline configuration data can still be traced back to the version control system by implementing immutable tags; calling a second API to pull the baseline configuration data from the database in real time to apply to different types of infrastructure; and calling a third API to monitor the configuration drift against the baseline configuration data.

According to exemplary embodiments, the process 600 may further include: implementing a source code mathematical system algorithm to manage the baseline configuration data from the version control system; automatically hydrating a runtime environment with all changes corresponding to the tracked configuration change data; and determining whether to execute a self-healing process to manage the configuration drift or whether to implement an outage operation to resolve the configuration drift.

According to exemplary embodiments, the process 600 may further include: executing the self-healing process based on a determination that a value associated with the configuration drift is below a predetermined threshold value.

According to exemplary embodiments, the process 600 may further include: executing the outage operation to resolve the drift based on a determination that a value associated with the configuration drift is equal to or above a predetermined threshold value.

According to exemplary process 600, the baseline configuration data may correspond to storage baseline infrastructure configuration data associated with each system among the plurality of systems of the eco-system, but the disclosure is not limited thereto.

According to exemplary process 600, the configuration drift may correspond to storage infrastructure configuration drift associated with each system among the plurality of systems of the eco-system, and the process 600 may further include: automatically updating the model to monitor a storage infrastructure configuration drift associated with each system among the plurality of systems of the eco-system.

According to exemplary embodiments, the DMAD 402 may include a memory (e.g., a memory 106 as illustrated in FIG. 1) which may be a non-transitory computer readable medium that may be configured to store instructions for implementing a DMAM 406 for monitoring configuration drift as disclosed herein. The DMAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DMAM 406 or within the DMAD 402, may be used to perform one or more of the methods and processes as described herein. In a particular embodiment, the instructions may reside completely, or at least partially, within the memory 106, the medium reader 112, and/or the processor 104 (see FIG. 1) during execution by the DMAD 402.

According to exemplary embodiments, the instructions, when executed, may cause a processor embedded within the DMAM 406 or the DMAD 402 to perform the following: establishing a communication link between a version control system and an eco-system including a plurality of systems each including corresponding baseline configuration data; receiving the baseline configuration data for each system from the eco-system; normalizing the received baseline configuration data; creating a model based on the normalized baseline configuration data, wherein the model includes a normalized set of hierarchical attributes data to maintain all baseline configuration associated with plurality of systems; storing the model including the normalized set of hierarchical attributes data onto the version control system; tracking configuration change data associated with each system in real-time via the version control system; automatically detecting a configuration drift by comparing the baseline configuration data with the configuration change data; and automatically updating the model to monitor the configuration drift. According to exemplary embodiments, the processor may be the same or similar to the processor 104 as illustrated in FIG. 1 or the processor embedded within DMAD 202, DMAD 302, DMAD 402, and DMAM 406.

According to exemplary embodiments, the instructions, when executed may further cause the processor 104 to perform the following: calling a first application programming interface (API) to load the model from the version control system into a database so that the baseline configuration data can still be traced back to the version control system by implementing immutable tags; calling a second API to pull the baseline configuration data from the database in real time to apply to different types of infrastructure; and calling a third API to monitor the configuration drift against the baseline configuration data.

According to exemplary embodiments, the instructions, when executed may further cause the processor 104 to perform the following: implementing a source code mathematical system algorithm to manage the baseline configuration data from the version control system; automatically hydrating a runtime environment with all changes corresponding to the tracked configuration change data; and determining whether to execute a self-healing process to manage the configuration drift or whether to implement an outage operation to resolve the configuration drift.

According to exemplary embodiments, the instructions, when executed may further cause the processor 104 to perform the following: executing the self-healing process based on a determination that a value associated with the configuration drift is below a predetermined threshold value.

According to exemplary embodiments, the instructions, when executed may further cause the processor 104 to perform the following: executing the outage operation to resolve the drift based on a determination that a value associated with the configuration drift is equal to or above a predetermined threshold value.

According to the exemplary processor 104, the baseline configuration data may correspond to storage baseline infrastructure configuration data associated with each system among the plurality of systems of the eco-system, but the disclosure is not limited thereto.

According to the exemplary processor 104, the configuration drift may correspond to storage infrastructure configuration drift associated with each system among the plurality of systems of the eco-system, and the instructions, when executed may further cause the processor 104 to perform the following: automatically updating the model to monitor a storage infrastructure configuration drift associated with each system among the plurality of systems of the eco-system.

According to exemplary embodiments as disclosed above in FIGS. 1-5, technical improvements effected by the instant disclosure may include a platform for implementing a platform and language agnostic drift monitoring application module for providing flexibility of multiple baseline management, auditability, review and configuration drift monitoring for storage infrastructure eco-system, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for monitoring configuration drift by utilizing one or more processors along with allocated memory, the method comprising:
    establishing a communication link between a version control system and an eco-system including a plurality of systems each including corresponding normalized baseline configuration data;
    receiving the normalized baseline configuration data for each system from the eco-system;
    creating a model based on the normalized baseline configuration data, wherein the model includes a normalized set of hierarchical attributes data to maintain all baseline configuration associated with plurality of systems;
    storing the model including the normalized set of hierarchical attributes data onto the version control system;
    tracking configuration change data associated with each system in real-time via the version control system;
    automatically detecting a configuration drift by comparing the baseline configuration data with the configuration change data; and
    automatically updating the model to monitor the configuration drift.

2. The method according to claim 1, further comprising:
    calling a first application programming interface (API) to load the model from the version control system into a database so that the baseline configuration data can still be traced back to the version control system by implementing immutable tags;
    calling a second API to pull the baseline configuration data from the database in real time to apply to different types of infrastructure; and
    calling a third API to monitor the configuration drift against the baseline configuration data.

3. The method according to claim 1, further comprising:
    implementing a source code mathematical system algorithm to manage the baseline configuration data from the version control system;
    automatically hydrating a runtime environment with all changes corresponding to the tracked configuration change data; and
    determining whether to execute a self-healing process to manage the configuration drift or whether to implement an outage operation to resolve the configuration drift.

4. The method according to claim 3, further comprising:
    executing the self-healing process based on a determination that a value associated with the configuration drift is below a predetermined threshold value.

5. The method according to claim 3, further comprising:
    executing the outage operation to resolve the drift based on a determination that a value associated with the configuration drift is equal to or above a predetermined threshold.

6. The method according to claim 1, wherein the baseline configuration data corresponds to storage baseline infrastructure configuration data associated with each system among the plurality of systems of the eco-system.

7. The method according to claim 6, wherein the configuration drift corresponds to storage infrastructure configuration drift associated with each system among the plurality of systems of the eco-system, and the method further comprising:
    automatically updating the model to monitor a storage infrastructure configuration drift associated with each system among the plurality of systems of the eco-system.

8. A system for monitoring configuration drift, the system comprising:
    a processor; and
    a memory operatively connected to the processor via a communication interface, the memory storing computer readable instructions, when executed, causes the processor to:
    establish a communication link between a version control system and an eco-system including a plurality of systems each including corresponding normalized baseline configuration data;
    receive the normalized baseline configuration data for each system from the eco-system;
    create a model based on the normalized baseline configuration data, wherein the model includes a normalized set of hierarchical attributes data to maintain all baseline configuration associated with plurality of systems;
    store the model including the normalized set of hierarchical attributes data onto the version control system;
    track configuration change data associated with each system in real-time via the version control system;
    automatically detect a configuration drift by comparing the baseline configuration data with the configuration change data; and
    automatically update the model to monitor the configuration drift.

9. The system according to claim 8, wherein the processor is further configured to:
    call a first application programming interface (API) to load the model from the version control system into a database so that the baseline configuration data can still be traced back to the version control system by implementing immutable tags;
    call a second API to pull the baseline configuration data from the database in real time to apply to different types of infrastructure; and
    call a third API to monitor the configuration drift against the baseline configuration data.

10. The system according to claim 8, wherein the processor is further configured to:
    implement a source code mathematical system algorithm to manage the baseline configuration data from the version control system;
    automatically hydrate a runtime environment with all changes corresponding to the tracked configuration change data; and
    determine whether to execute a self-healing process to manage the configuration drift or whether to implement an outage operation to resolve the configuration drift.

11. The system according to claim 10, wherein the processor is further configured to:
    execute the self-healing process based on a determination that a value associated with the configuration drift is below a predetermined threshold value.

12. The system according to claim 10, wherein the processor is further configured to:
    execute the outage operation to resolve the drift based on a determination that a value associated with the configuration drift is equal to or above a predetermined threshold.

13. The system according to claim 8, wherein the baseline configuration data corresponds to storage baseline infrastructure configuration data associated with each system among the plurality of systems of the eco-system.

14. The system according to claim 13, the configuration drift corresponds to storage infrastructure configuration drift associated with each system among the plurality of systems of the eco-system, and the processor is further configured to:
    automatically update the model to monitor a storage infrastructure configuration drift associated with each system among the plurality of systems of the eco-system.

15. A non-transitory computer readable medium configured to store instructions for monitoring configuration drift, wherein, when executed, the instructions cause a processor to perform the following:
    establishing a communication link between a version control system and an eco-system including a plurality of systems each including corresponding normalized baseline configuration data;
    receiving the normalized baseline configuration data for each system from the eco-system;
    normalizing the received baseline configuration data;
    creating a model based on the normalized baseline configuration data, wherein the model includes a normalized set of hierarchical attributes data to maintain all baseline configuration associated with plurality of systems;
    storing the model including the normalized set of hierarchical attributes data onto the version control system;
    tracking configuration change data associated with each system in real-time via the version control system;
    automatically detecting a configuration drift by comparing the baseline configuration data with the configuration change data; and
    automatically updating the model to monitor the configuration drift.

16. The non-transitory computer readable medium according to claim 15, wherein the instructions, when executed, cause the processor to further perform the following:
    calling a first application programming interface (API) to load the model from the version control system into a database so that the baseline configuration data can still be traced back to the version control system by implementing immutable tags;
    calling a second API to pull the baseline configuration data from the database in real time to apply to different types of infrastructure; and
    calling a third API to monitor the configuration drift against the baseline configuration data.

17. The non-transitory computer readable medium according to claim 15, wherein the instructions, when executed, cause the processor to further perform the following:
    implementing a source code mathematical system algorithm to manage the baseline configuration data from the version control system;
    automatically hydrating a runtime environment with all changes corresponding to the tracked configuration change data; and
    determining whether to execute a self-healing process to manage the configuration drift or whether to implement an outage operation to resolve the configuration drift.

18. The non-transitory computer readable medium according to claim 17, wherein the instructions, when executed, cause the processor to further perform the following:
    executing the self-healing process based on a determination that a value associated with the configuration drift is below a predetermined threshold value.

19. The non-transitory computer readable medium according to claim 17, wherein the instructions, when executed, cause the processor to further perform the following:
    executing the outage operation to resolve the drift based on a determination that a value associated with the configuration drift is equal to or above a predetermined threshold.

20. The non-transitory computer readable medium according to claim 15, wherein the baseline configuration data corresponds to storage baseline infrastructure configuration data associated with each system among the plurality of systems of the eco-system, and wherein the configuration drift corresponds to storage infrastructure configuration drift associated with each system among the plurality of systems of the eco-system, and the instructions, when executed, cause the processor to further perform the following:
    automatically updating the model to monitor a storage infrastructure configuration drift associated with each system among the plurality of systems of the eco-system.

* * * * *